United States Patent
Sharaga et al.

(10) Patent No.: US 9,621,547 B2
(45) Date of Patent: Apr. 11, 2017

(54) TRUST ESTABLISHMENT BETWEEN A TRUSTED EXECUTION ENVIRONMENT AND PERIPHERAL DEVICES

(71) Applicant: McAfee, Inc., Santa Clara, CA (US)

(72) Inventors: Avishay Sharaga, Bet Nehemya (IL); Alex Nayshtut, Gan Yavne (IL); Oleg Pogorelik, Lapid (IL); Igor Muttik, Hertfordshire (GB); Ned M. Smith, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/580,204

(22) Filed: Dec. 22, 2014

(65) Prior Publication Data

US 2016/0182499 A1    Jun. 23, 2016

(51) Int. Cl.
   *G06F 21/70* (2013.01)
   *H04L 29/06* (2006.01)
   *H04L 9/12* (2006.01)

(52) U.S. Cl.
   CPC ........ *H04L 63/0853* (2013.01); *H04L 63/061* (2013.01); *H04L 63/0823* (2013.01); *H04L 63/0876* (2013.01)

(58) Field of Classification Search
   CPC ........... G06F 13/10; G06F 21/73; G06F 21/74
   See application file for complete search history.

(56) References Cited

U.S. PATENT DOCUMENTS 8,578,161 B2 *  11/2013  Smith ............... H04L 9/3252
                                                  380/30
2009/0063851 A1   3/2009  Nijdam
2009/0287922 A1  11/2009  Herwono et al.
2011/0261960 A1  10/2011  Cho et al.
2012/0204027 A1   8/2012  Baek et al.
(Continued)

FOREIGN PATENT DOCUMENTS

WO    WO2016-105784    6/2016

OTHER PUBLICATIONS

Trust Extension Device: Providing Mobility and Portability of Trust in Cooperative Information Systems. Nepal et al. Springer-Verlag(2007).*

(Continued)

*Primary Examiner* — Venkat Perungavoor
(74) *Attorney, Agent, or Firm* — Patent Capital Group

(57) ABSTRACT

Technologies are provided in embodiments to establish trust between a trusted execution environment (TEE) and a peripheral device. Embodiments are configured to communicate with an attestation server to generate an encryption key, and to establish, using the encryption key, a secure connection with an authentication server to enable communication between the authentication server and the peripheral device. Embodiments are also configured to receive a pairwise master key if the peripheral device is authenticated and to receive a trusted communication from the peripheral device based, at least in part, on the pairwise master key. Embodiments may also be configured to identify a connection to the peripheral device before the peripheral device is authenticated to the authentication server, receive an identifier from the peripheral device, and establish a connection to an attestation server based on at least a portion of the identifier.

27 Claims, 9 Drawing Sheets

(56) References Cited

U.S. PATENT DOCUMENTS

| | | | |
|---|---|---|---|
| 2014/0033316 A1 | 1/2014 | Paczkowski | |
| 2014/0281527 A1* | 9/2014 | Kobres | G06F 21/44 713/168 |
| 2014/0317409 A1* | 10/2014 | Bartok | H04L 63/06 713/171 |

OTHER PUBLICATIONS

User Authentication for Online Applications Using a USB-Based Trust Device. Jang et al. ICSSITE(2010).*
Client-Based Authentication Technology: User-Centri Authentication Using Secure Container. Cahill et al. ACM(2011).*
An Anomaly Based Approach for HID Attack Detection Using Keystoke Dynamics. Barbhuiya et al. Springer-Verlag(2012).*
International Search Report and Written Opinion in International Patent Application PCT/US2015/062238 dated Feb. 26, 2016.

* cited by examiner

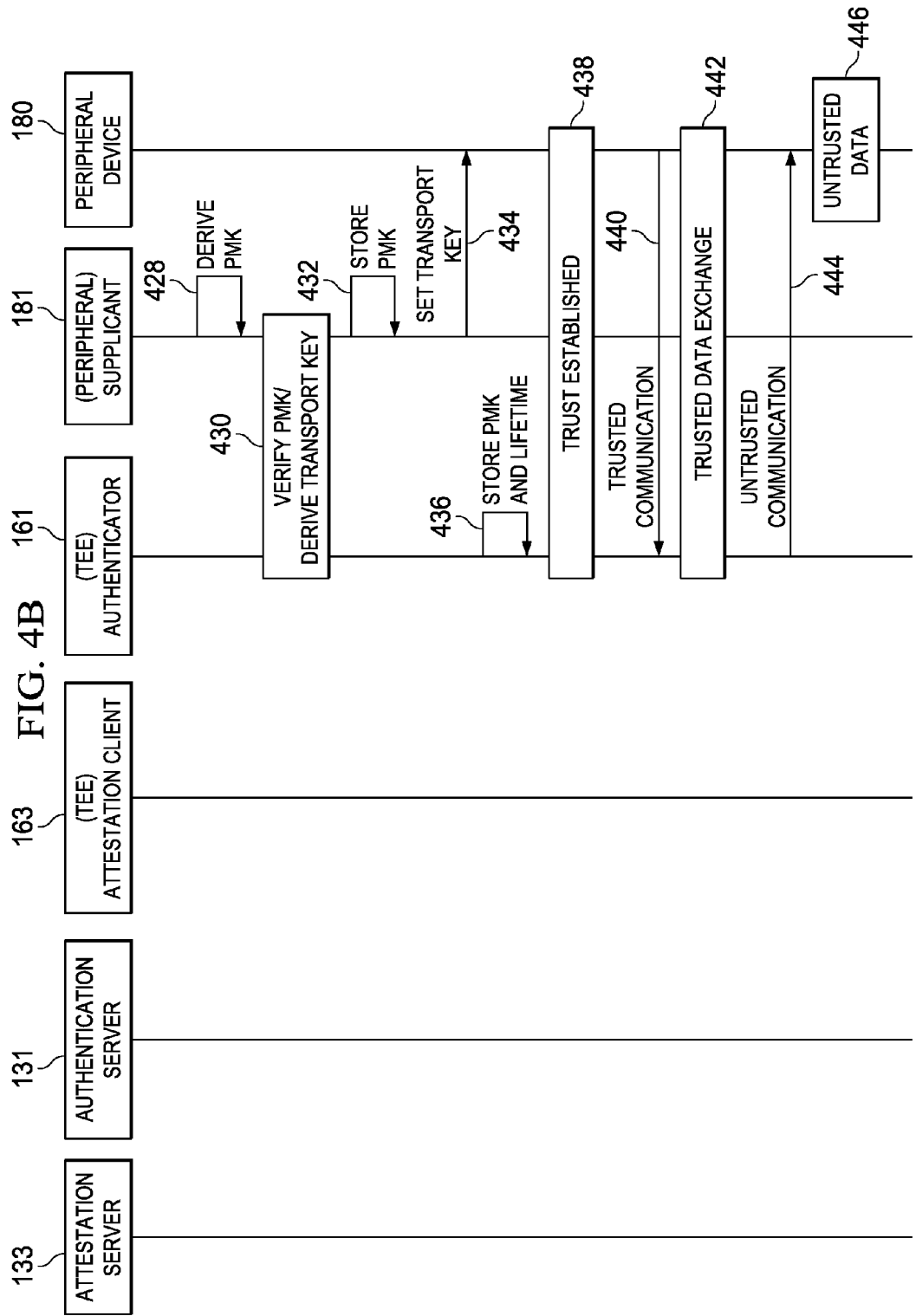

TRUST ESTABLISHMENT BETWEEN A TRUSTED EXECUTION ENVIRONMENT AND PERIPHERAL DEVICES

TECHNICAL FIELD

This disclosure relates in general to the field of computer network security, and more particularly, to trust establishment between a trusted execution environment and peripheral devices.

BACKGROUND

The field of computer security has become increasingly important in today's society. Computer platforms are increasingly designed with a trusted execution environment (TEE) that provides a secure area of hardware in which code and data can be loaded and guaranteed to be protected with respect to confidentiality and integrity. A TEE provides an isolated execution environment in a computing device in which trusted applications can be executed with access to a device's processor and memory, while the hardware isolation protects the trusted applications from other applications running in a main operating system of the device, for example.

Numerous internal and external hardware peripherals may be used by computing devices. Establishing trust between these hardware peripherals and a trusted execution environment of a computing device can be complicated due, at least in part, to the large number and types of peripheral devices, as well as the wide range of vendors and original equipment manufacturers (OEMs) offering these peripheral devices. Thus, computer architects face significant challenges in establishing trust between peripheral devices and a trusted execution environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A-4B show an interaction diagram illustrating possible interactions associated with at least one embodiment of the system for establishing trust according to the disclosure;

DETAILED DESCRIPTION OF EMBODIMENTS

Figure 1:
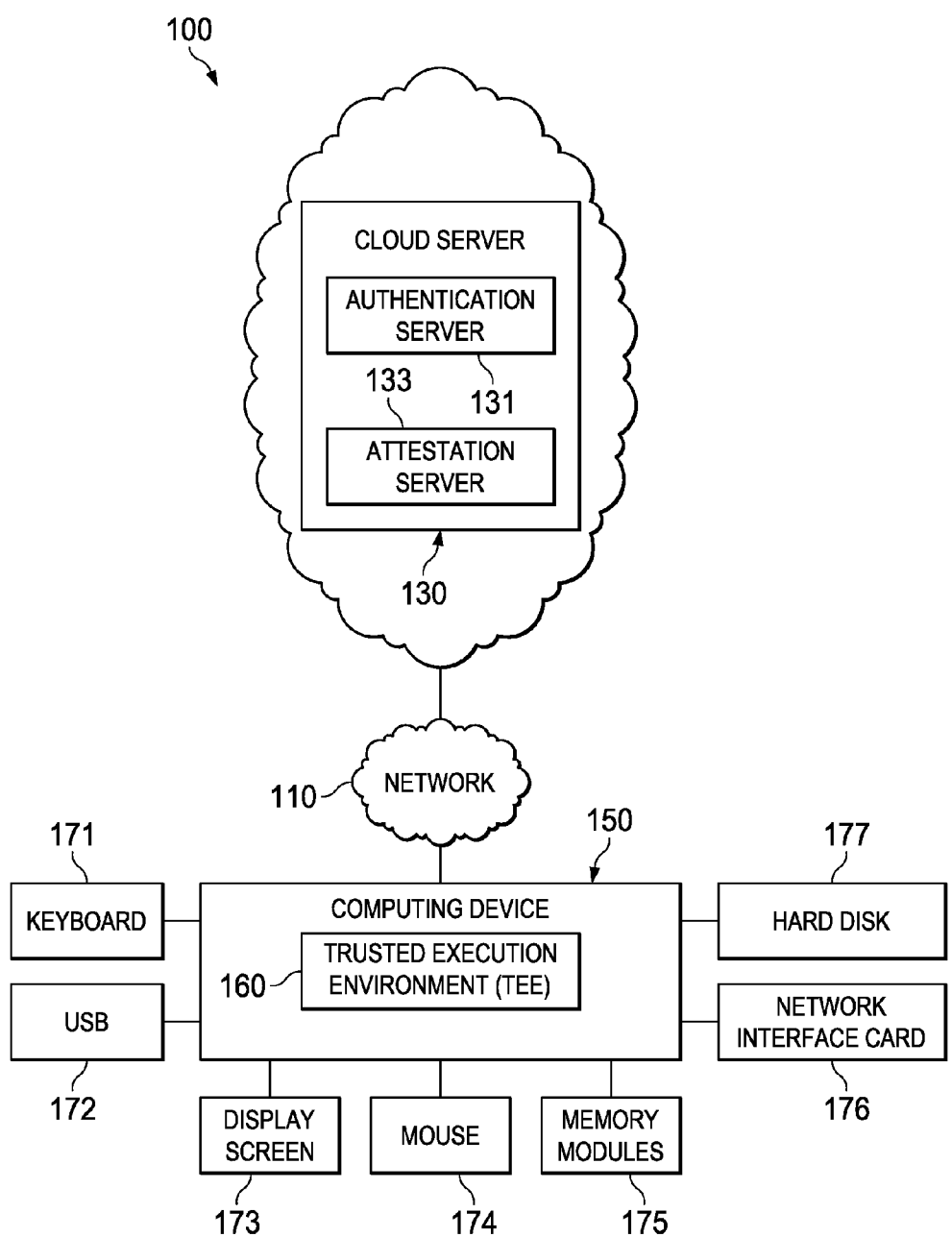
FIG. 1 is a simplified block diagram of a communication system for establishing trust between a trusted execution environment (TEE) and hardware peripherals according to at least one embodiment of the present disclosure.

FIG. 1 is a simplified block diagram of an example communication system 100 for establishing trust between a trusted execution environment (TEE) and peripheral devices. Communication system 100 includes an example computing device 150 with a TEE 160. Computing device 150 can be coupled to multiple internal and external peripheral devices. Examples of internal and external peripheral devices may include, but are not limited to a keyboard 171, a universal serial bus (USB) storage device 172, a display screen 173, a mouse 174, memory modules 175, a network interface card (NIC) 176, and a hard disk 177. A network 110 can facilitate network communication between computing device 150 and a cloud server 130. Cloud server 130 can be configured with one or more servers including an authentication server 131 and an attestation server 133.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. As an example, attestation server 133 and authentication server 131 may reside on the same machine or separate machines. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

For purposes of illustrating certain example techniques of a system for establishing trust between a TEE and peripheral devices, it is important to understand the activities that may be occurring in communication system 100. The following foundational information may be viewed as a basis from which the present disclosure may be properly explained.

A trusted execution environment (TEE) in a computing platform of a computing device protects data and code loaded in the TEE from software attacks and some hardware attacks. A TEE can be provided in any computing platform of a computing device. An example TEE implementation could use embedded hardware technology such as Intel® Software Guard Extensions (SGX), available from Intel Corporation, Santa Clara, Calif. TEEs are often configured in mobile computing devices including, but not limited to, laptops, smartphones, tablets, set-top boxes, smart televisions, gaming systems, car infotainment systems, etc. However, TEEs may also be provided in other computing devices including, but not limited to, desktops, servers, clients, etc. Although some input/output transactions of a TEE may be protected from software attacks, they are not typically protected from hardware attacks. If access is gained to a computer bus or interface of the computing device, then the input/output transactions may be vulnerable.

Establishing trust in hardware peripherals is needed for any TEE to be dependable and trustworthy. Hardware peripherals can include internal peripheral devices (e.g., hard disk, memory modules, network interface card (NIC), other layers of memory hierarchy, etc.) and external peripheral devices (e.g., keyboard, hard disk, input device, USB, etc.). However, the large number of different peripherals provided by a wide range of vendors and OEMs complicates trust establishment to a TEE. One-to-one relationships are difficult to manage and do not scale well. Nevertheless, there is a need for trusted applications to be able to use available peripheral devices and to verify their trust level or reputation.

Several deficiencies limit the scope of current solutions for trusted peripheral devices connected to a TEE. First, hardware peripherals in which trust is established are limited to peripheral devices controlled by a System on a Chip vendor (SoC), which is typically internal to the SoC/board. Protections in a TEE are generally limited to software attacks. The hardware enforces isolation but data is not protected end-to-end. Wired and wireless external peripheral devices are not supported, and point solutions of specific peripheral models that are done in manufacturing are not generally applicable to other peripheral devices. Finally, current TEE solutions also do not support multi-stream peripheral devices at a stream level. For example, TEE solutions do not provide separation between trusted and untrusted USB streams in the controllers.

The architecture of communication system 100 for establishing trust between a trusted execution environment (TEE) and peripheral devices, as outlined in FIG. 1, can resolve these issues and others. In at least one embodiment, a new trusted connection protocol is provided to enable an end-to-end (E2E) trusted connection to be established between any type of peripheral device (e.g., internal or external) and a TEE. In at least one embodiment, Extensible Authentication Protocol (EAP) is used as the foundation of the E2E trusted connection protocol for creating trust between a peripheral device and a TEE based on (1) trust that exists between the peripheral device and an authentication server configured with one or more credentials associated with the peripheral device (or configured with the capability to access the one or more credentials associated with the peripheral device) and (2) trust established between the TEE and the authentication server using TEE attestation capability based on any TEE root of trust.

The peripheral device may be configured with an EAP supplicant, an EAP method (e.g., EAP-Transport Layer Security (TLS)), and one or more relevant credentials (e.g., X.509 certificate). The EAP method and corresponding credentials are also provisioned in the authentication server, which supports attestation of a TEE (e.g., via an attestation server) for dynamically establishing an encryption key to be used as a Radius or Diameter secret. Setting the Radius or Diameter secret enables the TEE to establish a secure connection to the authentication server. The EAP method can then be performed for end-to-end authentication of the supplicant (of the peripheral device) to the authentication server. A pairwise master key (PMK) can be generated as a result of a successful EAP method. The pairwise master key can be provided to the TEE to be stored, along with a lifetime parameter. Accordingly, trust can be established for communications between the TEE and the peripheral device until the lifetime parameter expires, without re-establishing trust to the authentication server and obtaining another pairwise master key each time. In at least one embodiment, a master key is generated from a successful EAP method and can be used to derive the pairwise master key. In other embodiments, the pairwise master key could be equivalent or otherwise correspond to the master key.

Embodiments disclosed herein provide a generic solution, which significantly reduces the complexity of establishing trust between a TEE and various peripheral devices. Embodiments provide E2E trusted relationships between peripheral devices and a TEE, which protects against software attacks and hardware attacks. This E2E trusted connection is applicable to all types of peripheral devices including internal peripheral devices (e.g., in a SoC, on a board) or external peripheral devices, while also removing the dependencies between a particular peripheral device and a TEE during manufacturing. The system is not limited to a particular authentication method and credentials, but is flexible enough to allow different authentication methods and credentials based on, for example, particular implementation needs. Credentials stored on a peripheral device can be leveraged to attest to the reputation of the peripheral device with regard to trust, implementation, certification, etc. Any peripheral vendor can implement the trust capabilities independently of other platform vendors. In a possible implementation, a vendor of a peripheral device may configure (or cause the configuring of) an authentication server with credentials associated with the peripheral device. In this scenario, the only dependency of the method and credentials is internal to the peripheral vendor, and consequently, there is no dependency on the platform/TEE vendor or other peripheral vendors. For high security scenarios, an authentication server can be implemented in-house and credentials can be provided to the vendors. Finally, the system is physical connection independent and scalable to all types of peripheral devices.

Figure 2:
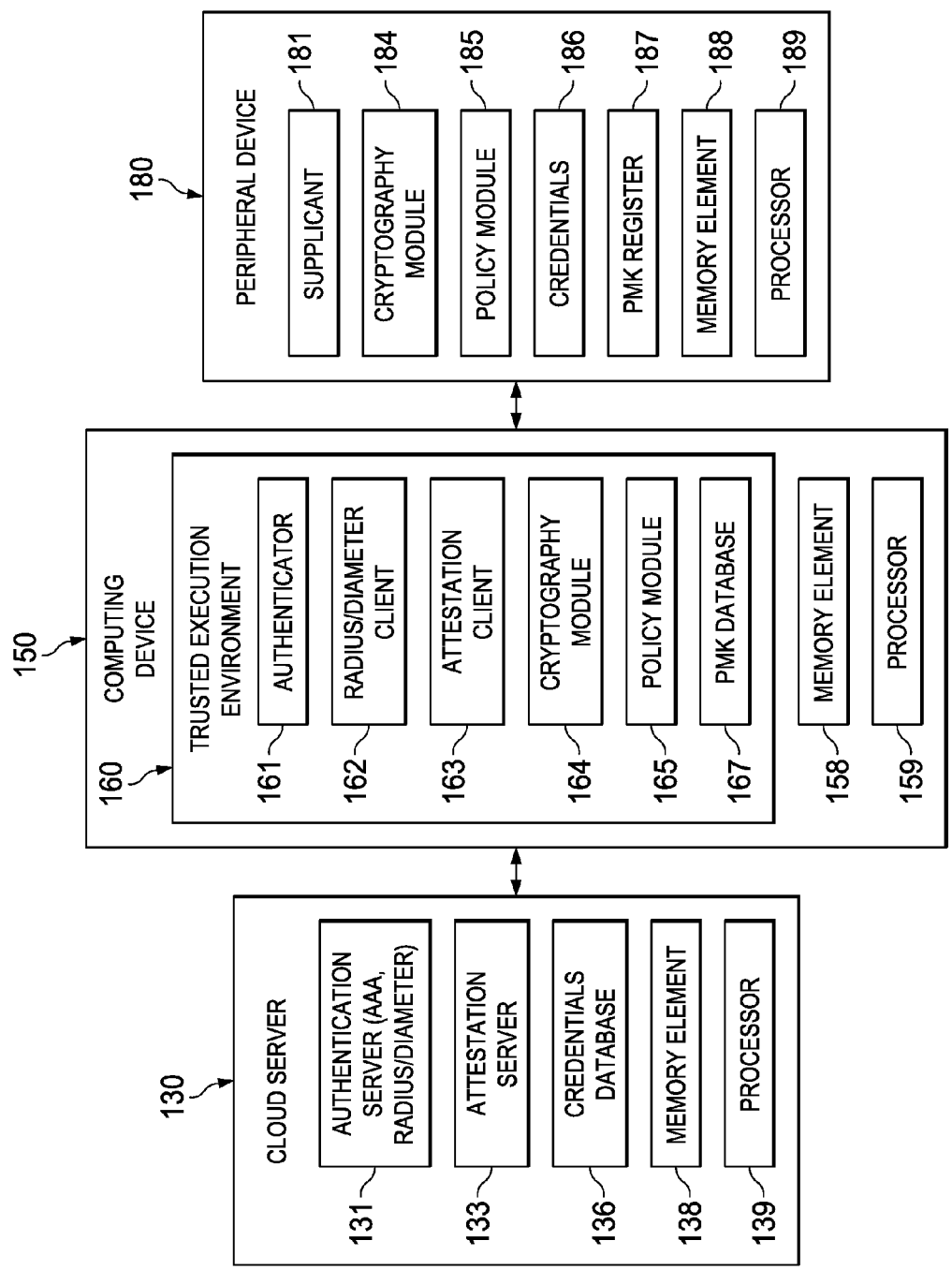
FIG. 2 is a simplified block diagram illustrating additional details of components of the system for establishing trust according to at least one embodiment.

Turning to FIG. 2, FIG. 2 is a simplified block diagram illustrating one possible set of details associated with communication system 100. Computing device 150 is configured with trusted execution environment (TEE) 160, which can include an authenticator 161, a radius/diameter client 162, an attestation client 163, a cryptography module 164, a policy module 165, a pairwise master key (PMK) database 167, a memory element 158, and a processor 159. An example peripheral device 180 can include a supplicant 181, a cryptography module 184, a policy module 185, one or more credentials 186, a PMK register 187, a memory element 188, and a processor 189. Cloud server 130 can include authentication server 131, attestation server 133, one or more credentials database 136, a memory element 138, and a processor 139. Before discussing potential flows associated with the architectures of FIGS. 1-2, a brief discussion is provided about some of the possible components and infrastructure that may be associated with communication system 100.

Generally, communication system 100 can include any type or topology of networks, indicated by network 100. Network 110 represents a series of points or nodes of interconnected communication paths for receiving and sending network communications that propagate through communication system 100. Network 110 offers a communicative interface between nodes, and may be configured as any local area network (LAN), body area network (BAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof. Network 110 can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., Ethernet, etc.) communication. Generally, any suitable means of communication may be used such as electric, sound, light, infrared, and/or radio (e.g., WiFi, Bluetooth or NFC).

Network traffic (also referred to herein as 'network communications' and 'communications'), can be inclusive of packets, frames, signals, data, objects, etc., and can be sent and received in communication system 100 according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to any type of binary, numeric, voice, video, textual, photographic, or script data, or any type of source or object code, or any other suitable information in any appropriate format that may be communicated from one point to another in computing systems (e.g., servers, computing devices, peripheral devices, etc.) and/or networks. Additionally, messages, requests, responses, replies, queries, etc. are forms of network traffic.

Cloud server 130 represents one or more servers configured by a vendor of peripheral devices (or by another capable entity) to enable trust to be established between TEEs and the peripheral devices associated with the vendor. A vendor could be a manufacturer, seller, producer, end device owner (e.g., Information Technology shop, etc.), etc. of peripheral devices. A vendor configures (or causes to be configured) its peripheral devices with credentials and supplicants. In one possible implementation, the vendor may also configure (or cause to be configured) one or more servers with corresponding credentials or access to corresponding credentials. In other possible implementations, a server may be configured by any other entity capable of configuring the server with credentials that correspond to the credentials configured in the peripheral devices. For example, an authentication server may be implemented with credentials in-house in high security scenarios, and corresponding credentials can be provided to the vendors to configure the peripheral devices. Cloud server 130 is an example of a server that could be configured by a vendor or other capable entity.

Cloud server 130 can be provisioned in any suitable network environment capable of network access (e.g., via network 110) to a TEE of a computing device. Such network environments can include, but are not limited to, the backbone of the vendor's network infrastructure, which may be configured on the premises of the vendor, the backbone of a network infrastructure of an entity associated with end devices when an authentication server is implemented in-house, or one or more cloud networks offered by a cloud service provider. The configuration and provisioning of a peripheral device and the associated cloud server enables an end-to-end trusted relationship between the peripheral device and a TEE of a computing device to be established.

A server, such as cloud server 130, is a network element, which is meant to encompass routers, switches, gateways, bridges, loadbalancers, firewalls, inline service nodes, proxies, proprietary appliance, servers, processors, modules, SDN controller/switch, or any other suitable device, component, element, or object operable to exchange information in a network environment. This network element may include any suitable hardware, software, firmware, components, modules, interfaces, or objects that facilitate the operations thereof. This may be inclusive of appropriate algorithms and communication protocols that allow for the effective exchange of data or information.

Cloud server 130 can include authentication server 131, attestation server 133, credentials database 136, a memory element 138, and a processor 139. Authentication and attestation servers 131 and 133 may be discrete entities residing in different machines or may be combined in a single cloud server, as shown in FIG. 2. In at least one embodiment, authentication server 131 may be configured for a particular vendor as an authentication, authorization, and accounting (AAA) server. An authentication server 131 can operate according to either Radius (Remote Authentication Dial-In User Services) protocol, as defined by Internet Engineering Task Force (IETF) Request for Comments (RFC) 2865, entitled "Remote Authentication Dial In User Service (RADIUS)," dated June 2000, or by a successor protocol to RADIUS, referred to as Diameter and defined by IETF RFC 6733, entitled "Diameter Base Protocol," dated October 2012. Generally, a shared secret can be used with Radius and Diameter protocols to verify that received messages are sent by a Radius/Diameter-enabled device configured with the same shared secret. Additionally, the shared secret can also be used to verify message integrity (i.e., that the message has not been modified in transit). Accordingly, once a Radius/Diameter shared secret has been configured in a Radius/Diameter server and Radius/Diameter client, a trusted or secure connection can be established between the two.

Authentication server 131 may use one or more credentials in credentials database 136 to authenticate supplicant 181 of peripheral device 180. In at least one embodiment, multiple sets of one or more credentials may be stored in credentials database 136, where the multiple sets correspond, respectively, to credentials stored in the vendor's multiple peripheral devices. For example, credentials database 136 can include a particular set of one or more credentials that corresponds to a set of one or more credentials stored in peripheral device 180. In at least one embodiment, authentication server 131 can identify the one or more credentials in credentials database 136 that are associated with peripheral device 180 based on the peripheral device's identity, and can use the identified credentials to authenticate peripheral device 180 based on its corresponding credentials 186. In some embodiments, credentials database 136 may reside in some other storage, such as network access storage, that can be accessed by authentication server 131.

Example credentials can include, but are not limited to, an X.509 certificate, or a Universal Mobile Telecommunications System subscriber identity module (USIM). The X.509 certificate protocol is defined by IETF RFC 6960, entitled "X.509 Internet Public Key Infrastructure Online Certificate Status Protocol-OCSP," dated June 2013. The X.509 certificate can be used with an EAP authentication method defined by IETF RFC 5216, entitled "The EAP-TLS Authentication Protocol," dated March 2008. The USIM credentials can be used with an EAP authentication method defined by IETF RFC 4187, entitled "Extensible Authentication Protocol Method for 3rd Generation Authentication and Key Agreement (EAP-AKA)," dated January 2006. These examples are representative of possible credentials and EAP methods that may be implemented in communication system 100 according to one or more embodiments described herein. It will be apparent, however, that numerous other types of credentials may be used depending on particular needs and implementations.

In at least one embodiment, trust between cloud server 130 (via authentication server 131) and TEE 160 can be dynamically established. Cloud server 130 is capable of performing attestation protocol with a TEE and using an encryption key generated from that exchange as a Radius/

Diameter secret. In at least one embodiment, attestation server 133 uses an attestation and key exchange protocol to communicate with attestation clients in TEEs, such as attestation client 163 in TEE 160, to dynamically establish trust between the TEEs and the cloud server. The attestation exchange can cause an encryption key to be generated by the attestation server and the attestation client in the TEE. The encryption key may be symmetric (i.e., the same key is known to the endpoints) and can be a secret if it is known only to the endpoints (e.g., attestation client 163 and attestation server 133). For ease of reference, the encryption key is also referred to herein as 'symmetric key'. However, it will be apparent that other types of keys, such as asymmetric keys for example, may be used in other embodiments. Authentication server 131 can use the encryption key from attestation server 133 to configure a Radius/Diameter secret to enable trusted and secure communications with TEE 160.

In one particular example, attestation server 133 and attestation client 163 can use a SIGn-and-Mac (Sigma) provisioning protocol based on a Diffie-Hellman key exchange. The key exchange can be signed by an enhanced privacy identifier (EPID), which is a hardware protected key that allows anonymous attestation. The EPID key can be used to prove the integrity and validity of the key exchange. It will be apparent that any suitable key exchange protocol that results in an encryption key being generated may be implemented to dynamically establish trust between a TEE and a cloud server. Transport Layer Security (TLS) or Authentication and Key Agreement (AKA) protocol are non-limiting examples of other authentication and key exchange protocols that could potentially be implemented.

A computing device, such as computing device 150, is intended to represent any type of computing system that can be used to initiate network communications in a network and to which internal and/or external peripheral devices can be connected. Computing devices can include, but are not limited to, mobile devices, laptops, workstations, terminals, desktops, tablets, gaming systems, smartphones, infotainment systems, embedded controllers, smart appliances, global positioning systems (GPS), data mules, or any other device, component, or element capable of initiating voice, audio, video, media, or data exchanges within a network such as network 110. Computing device 150 may also be inclusive of a suitable interface to a human user (e.g., display screen 173) and input devices (e.g., keyboard 171, mouse 174) to enable a human user to interact with computing device 150.

Computing device 150 includes trusted execution environment (TEE) 160. Generally, a TEE is a secure hardware area on a platform and the TEE protects the confidentiality and integrity of code and data it contains. The platform, however, may run applications needing trusted communications with peripheral devices such as peripheral device 180. In at least one embodiment, TEE 160 includes attestation capability with an EAP authenticator.

Authenticator 161 is configured to use an EAP authentication framework to authenticate a peripheral (e.g., peripheral device 180) to its respective cloud server (e.g., cloud server 130) and establish trust with the peripheral using a unique pairwise master key generated during the EAP authentication. The end-to-end (E2E) authentication between peripheral device 180 and cloud server 130 can be implemented using any well-known EAP method including, but not limited to, EAP-TLS (Transport Layer Security (TLS) protocol with an X.509 certificate), EAP-AKA (Authentication and Key Agreement (AKA) protocol with a universal Subscriber Identity Module (USIM)), or EAP-FAST (Flexible Authentication via Secure Tunneling with a protected authentication credential (PAC)). Authenticator 161 can run over Radius/Diameter client 162 to communicate with authentication server 131. The Radius/Diameter protocol provides a secure connection between TEE 160 and cloud server 130.

The EAP authentication framework used by authenticator 161 is enhanced with an attestation capability of TEE 160 such as EPID or any root of trust/attestation inside the TEE. Attestation client 163 of TEE 160 communicates with attestation server 133 of cloud server 130 using an attestation and key exchange protocol (e.g., Sigma/EPID, TLS, AKA, etc.) to dynamically establish trust between TEE 160 and cloud server 130.

PMK database 167 is inclusive of a database or other suitable storage in which pairwise master keys (PMKs) can be stored. A PMK is the result of a successful EAP method in which a peripheral device is authenticated to a cloud server via a TEE of a computing device to which the peripheral device is connected. Each peripheral device to which TEE 160 has established trust via a successful EAP method may be associated with a PMK stored in PMK database 167.

Policy module 165 can make policy decisions related to the types of transactions occurring between TEE 160 and peripheral 180. For example, policy module 165 can determine whether a transaction should be protected or not (e.g., legacy mode) and communicates this policy decision to peripheral device 180 to enforce the policy. Cryptography module 164 can be a logical entity (e.g., general purpose processor) that performs cryptographic functions and/or analysis, for example, when the transactions are encrypted.

Peripheral device 180 is representative of any internal or external peripheral device that is associated with cloud server 130 and that connects to computing device 150. Peripheral devices can include, but are not limited to, keyboards, display screens, input devices (e.g., mouses, trackballs, microphones, touchpad, touch screen, video cameras, gesture/posture sensors, iris/fingerprint/vein readers, etc.), Global Positioning System (GPS)/gyroscope devices and other components, memory modules, hard disks, network interface cards, Radio-frequency identification (RFID) interfaces, smartcard readers, Deoxyribonucleic Acid (DNA) analyzers, medical equipment, health monitors (heartbeat, blood glucose and blood pressure monitors, etc.), etc. Peripheral devices can also encompass the Internet of Things (IoT) including, but not limited to, industrial equipment (e.g., sensors, actuators, embedded devices, etc.), home automation (e.g., locks, thermometers, hygrometers, etc.), etc.

Peripheral devices may be coupled with a computing device via a global, local or body area network (GAN, LAN or BAN) or any suitable combination thereof. For example, the sub-elements of server 130, computing device 150 and peripheral device 180 may communicate with each other via a global network (for example, the Internet), LAN or BAN, or any suitable combination thereof. Such communications may be wired, wireless or use any other means of transmission like electromagnetic (including light and infra-red), sound waves, skin conductivity, etc. By way of example, and not of limitation, external peripheral devices (e.g., keyboard 171, USB 172, display screen 173, mouse 174, video camera, microphone, other input devices, etc.) may use wired or wireless technologies (e.g., USB, WiFi, Bluetooth, etc.) to communicate with computing device 150. Internal peripheral devices (e.g., memory modules 175, network interface card 176, hard disk 177, etc.) may be included in a SoC or on circuit board of computing device 150.

Each peripheral device can be associated with a vendor that configures the peripheral device to enable authentication between the peripheral device and an associated cloud server. For example, the vendor may be a manufacturer who produces peripheral device 180 and configures peripheral device 180 with supplicant 181, credentials 186, and PMK register 187. Supplicant 181 may be configured with appropriate logic to request authentication to a TEE of a computing device to which the peripheral connects (e.g., via WiFi, Bluetooth, LAN, USB, etc.) and to perform an EAP method with authentication server 131 of cloud server 130. Memory 188 can be configured to maintain data needed to support the authentication, such as credentials 186, PMK register 187, etc.

Credentials 186 may support the EAP method (e.g., X.509 certificate for EAP-TLS). For example, credentials 186 can be used to attest about the peripheral reputation and/or certification to enable authentication between peripheral device 180 and cloud server 130. Credentials 186 are stored or embedded in some form of secure storage in peripheral device 180. Cloud server 130 can be provisioned with credentials (e.g., in credentials database 136) that correspond to credentials 186 in peripheral device 180.

PMK register 187 is inclusive of a register or other storage in which a pairwise master key (PMK) is stored. The PMK may be generated based on an EAP method performed between peripheral device 180 and cloud server 130, and can be verified between the peripheral device and the TEE. Policy module 185 can enforce policies related to the types of transactions occurring. For example, peripheral device 180 may not be dedicated only to TEE 160. Thus, for trusted transactions, peripheral device 180 may perform encryption, but for normal transactions, messages may be sent to a normal processor in the computing device without any protection or encryption. Cryptography module 184 can be a logical entity (e.g., general purpose processor) that performs cryptographic functions and/or analysis.

Figure 3:
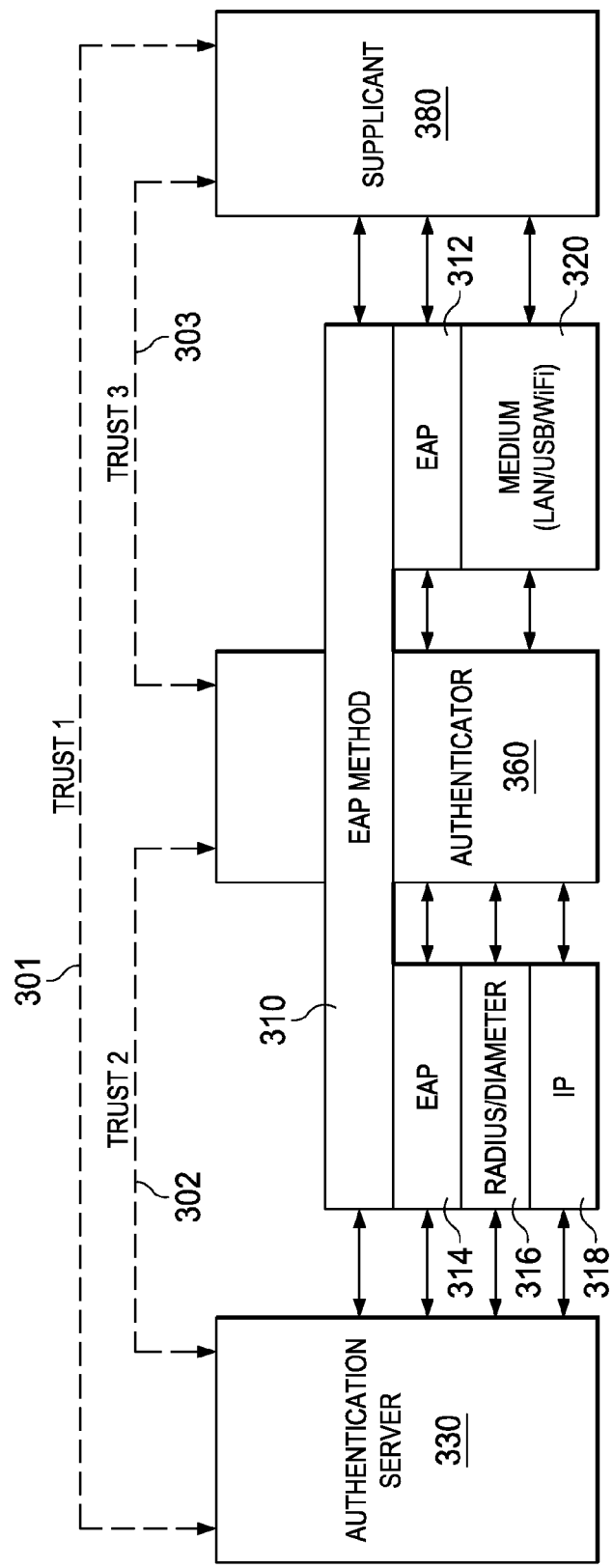
FIG. 3 is a simplified block diagram illustrating an example stack of an extensible authentication protocol (EAP) according to at least one embodiment.

Turning to FIG. 3, FIG. 3 illustrates logical entities included in at least one embodiment of an extensible authentication protocol (EAP) authentication framework according to the present disclosure. EAP is an authentication framework that is generally used for network communications and is defined in IETF RFC 3748, entitled "Extensible Authentication Protocol (EAP)," dated June 2004. In at least one embodiment, the logical entities of the EAP authentication framework include a supplicant 380, an authenticator 360, and an authentication server 330. Supplicant 380 resides in an end device that requests authentication (e.g., supplicant 181 in peripheral device 180). Authenticator 360 resides in the entity with whom the supplicant needs to establish trust by access and shared keys (e.g., authenticator 161 in TEE 160). Authentication server 330 has corresponding (the same or complementary) credentials with supplicant 380 and performs an authentication protocol, such as an EAP method. Authentication server 330 can be an authentication server in a cloud server (e.g., authentication server 131 in cloud server 130).

The EAP framework, as shown in FIG. 3, may use the Radius or Diameter protocols 316 between authenticator 360 and authentication server 330. Radius and Diameter protocols are secure protocols with a pre-shared key (e.g., Radius key, Diameter key) that is established out-of-band from the protocol. In at least one example, communication between authenticator 360 and authentication server 330 may occur using Internet Protocol (IP) 318 over a network, such as network 110. A medium 320 used for communication between supplicant 380 and authenticator 360 can be wired or wireless and is considered non-secure until trust is established. Common, but non-limiting examples of medium 320 include LANs, USBs, and WiFi. The EAP framework enables the establishment of trust in medium 320 while utilizing the medium itself for message exchange.

Supplicant 380 can initiate authentication with authentication server 330 as the authentication target. Authenticator 360 is a middle entity that forwards messages between the supplicant and authentication server. An EAP method 310 is a layer on top of the EAP framework and is the end-to-end (E2E) authentication method to verify Trust 1, represented at 301, between supplicant 380 and authentication server 330. EAP 312 and EAP 314 represent messages of EAP method 310 that are received and forwarded by authenticator 360 when authentication server 330 and supplicant 380 are performing EAP method 310. Any EAP method, using appropriate credentials for the particular method, may be used on the EAP framework of FIG. 3 including, for example, EAP-TLS (using X.509 certificates), EAP-AKA (using USIM), EAP-Fast (using PAC), etc.

A shared secret (also referred to herein as 'master key') is created in both authentication server 330 and supplicant 380 as a result of successful E2E authentication of supplicant 380 to authentication server 330. In addition, the shared secret is known only to authentication server 330 and supplicant 380. In one example EAP method, after master key is created in authentication server 330, authentication server 330 then provides the master key to supplicant 380. It will be apparent, however, that other EAP methods may employ different methodologies for creating the master key in the endpoints. Authentication server 330 can share the secret (or a derivative of the secret) with authenticator 360 using a secure tunnel based on the trust they have established with each other. For example, EAP 312 may use the secure connection via the Radius/Diameter protocol to send to authenticator 360 a pairwise master key (PMK), which may be the shared secret or a derivative of the shared secret. If the pairwise master key is a derivative of a master key, then supplicant 380 can derive the same pairwise master key or a complementary pairwise master key from the shared secret created during authentication. As a result, authenticator 360 and supplicant 380 can have corresponding (the same or complementary) pairwise master keys. Trust 3, represented at 303, can be established between supplicant 380 and authenticator 360 based, at least in part, on the pairwise master key.

As described above, the EAP framework illustrated in FIG. 3 is used to establish Trust 1 and Trust 3. Trust 2, however, can be dynamically created between authenticator 360 (inside a TEE) and authentication server 330 with an attestation and key exchange protocol. Examples of such a protocol include, but are not limited to, EPID-Sigma where a symmetric key is generated and then used to set the Radius/Diameter secret for the session between authenticator 360 and authentication server 330. Although EPID-Sigma is one possible attestation capability that can be implemented according to embodiments described herein, any root of trust/attestation inside the TEE may be used. Moreover, while the encryption key is a symmetric key in this illustration, it will be apparent that other types of encryption keys, such as asymmetric keys for example, may be created in attestation client 163 and attestation server 133 in other embodiments.

In one possible embodiment, encryption keys established during the attestation of the TEE to the attestation server may be stored in a trusted cache (or other suitable storage) at each endpoint. Thus, in the event of a connection or power loss, the E2E trusted connection protocol to establish trust between the peripheral device and the TEE may be re-initiated, and the cached encryption keys may be used rather than duplicating the attestation that was previously performed. Similarly, a master key determined during an EAP method may also be stored in a trusted cache (or other suitable storage) at each endpoint. Thus, the stored master key may be used in an E2E trusted connection protocol that is re-initiated subsequent to a connection or power loss. In at least one embodiment, the cached keys can be included in a hash of the prior key negotiation message exchanges concatenated together.

Figure 4A:
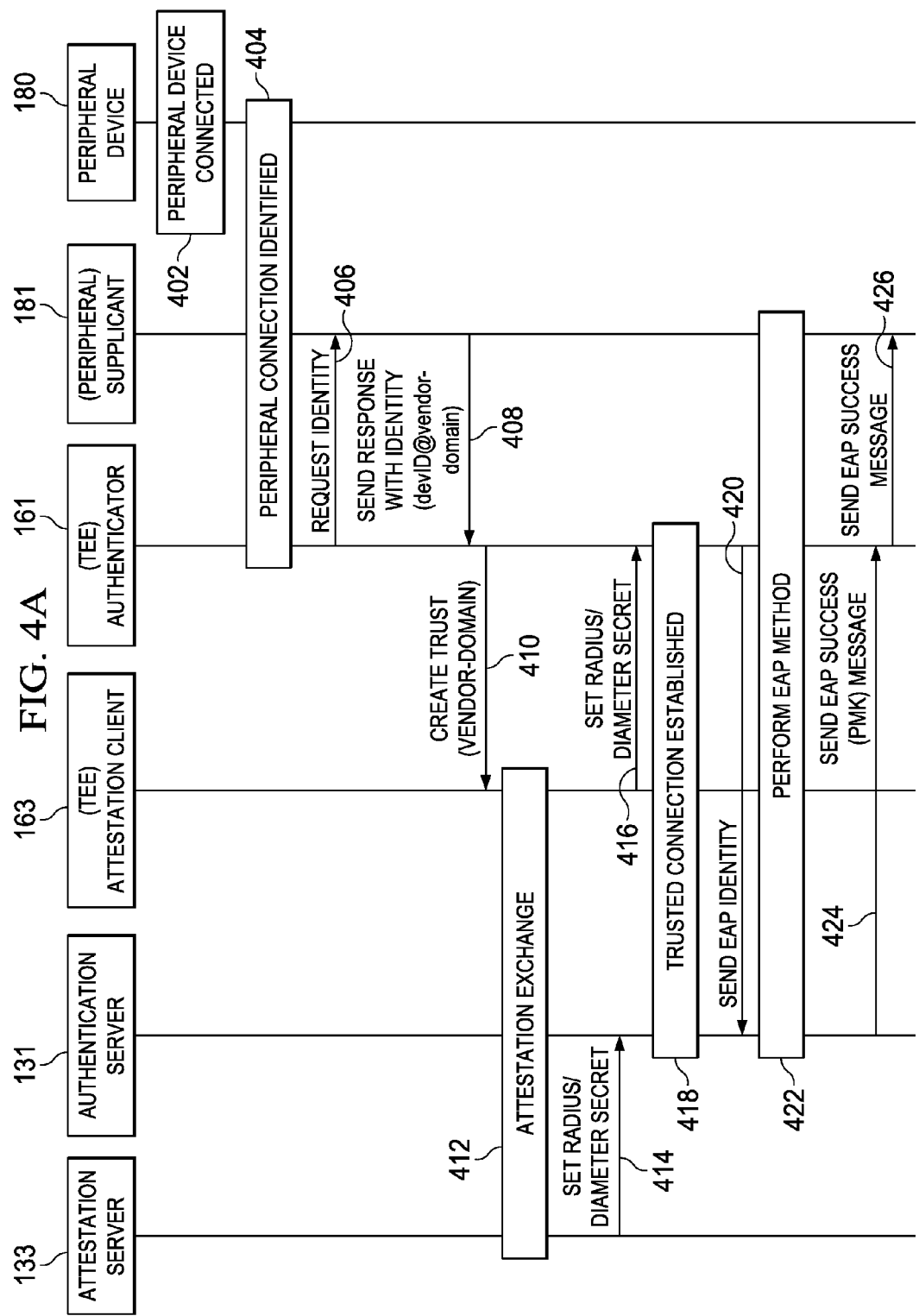

Turning to FIGS. 4A-4B, a simplified interaction diagram illustrates possible interactions that may occur in communication system 100 between attestation server 133, authentication server 131, attestation client 163, authenticator 161, supplicant 181, and peripheral device 180, according to at least one embodiment. The example of FIGS. 4A-4B is merely an example of potential interactions, and does not limit the scope of the claims. For example, number of modules may vary, number of components may vary, specific interactions may vary, order of interactions may vary, etc.

FIGS. 4A-4B illustrate a possible scenario, according to at least one embodiment, of a new peripheral device being introduced to a computing device that includes a trusted execution environment. Supplicant 181 of peripheral device 180, authenticator 161 and attestation client 163 of computing device 150, and authentication server 131 and attestation server 133 of cloud server 130 interact to perform the example E2E trusted connection protocol illustrated in FIGS. 4A-4B. Authentication server 131 and attestation server 133 may be provisioned in a single server, such as cloud server 130 or may be provisioned as separate entities.

At 402, peripheral device 180 connects to computing device 150. This connection may be, for example, via LAN, USB, WiFi, Bluetooth, etc. At 404, authenticator 161 of TEE 160 identifies the connection between peripheral device 180 and computing device 150. At 406, authenticator 161 may start the EAP authentication with peripheral device 180 by requesting the identity of the peripheral via an EAP-Request-Identity message sent to supplicant 181 of peripheral device 180. At 408, supplicant 181 responds with an identifier in an EAP-Response-Identity message. In at least one embodiment, the identifier can be in the form of a text string like "devID@vendor-domain". Based on the identifier received from peripheral device 180, authenticator 161 can determine which domain includes an authentication server to target for authentication of peripheral device 180. For example, if the received identifier is "keyboard@keyboards.com", then the identifier can be parsed to identify the domain name of "keyboards.com". An authentication server in "keyboards.com" can be targeted for authentication. In at least some implementations, when the vendor configures and provisions authentication server 130, the target domain may be the vendor's domain.

At 410, authenticator 161 can invoke attestation client 163 to dynamically create trust with the authentication server at the identified domain (e.g., "keyboards.com"). Attestation client 163 initiates an attestation exchange 412 with attestation server 133 to dynamically create the desired trust. In at least one embodiment, the attestation exchange can be enhanced to include other related parameters like measurements, for example, to provide a more accurate reputation of the TEE and authenticator 161. This may be realized, for example, in TEE implementations using Intel® Software Guard Extensions (SGX). In one example, attestation exchange 412 can be performed using the EPID-Sigma protocol. In this implementation, attestation server 133 may contain a Sigma certificate and attestation client 163 may contain an EPID certificate. The certificates can be used during attestation exchange 412 to perform a Diffie-Hellman key agreement protocol resulting in an encryption key being generated at both attestation client 163 and attestation server 133. The encryption keys of this example illustration are symmetric keys and can be stored for later use in encrypting and decrypting messages.

Once the attestation is completed, at 414, attestation server 133 can set the Radius/Diameter secret for authentication server 131 based on the symmetric key generated in attestation server 133 during the attestation exchange. At 416, attestation client 163 can set the Radius/Diameter secret for authenticator 161 based on the symmetric key generated in the TEE during the attestation exchange. Once the Radius/Diameter secrets have been configured for authentication server 131 and authenticator 161 of TEE 160, a trusted Radius/Diameter connection can be established at 418 between authentication server 131 and authenticator 161.

At 420, the authenticator can send the EAP identity of peripheral device 180 to authentication server 131. The EAP identity can be the identifier received from supplicant 181 at 408. The EAP identity can enable authentication server 131 to determine corresponding credentials of peripheral device 180 that are stored, for example, in credentials database 136. At 422, authentication server 131 and authenticator 161 may agree to use a particular EAP method. For example, the vendor of peripheral device 180 may have configured and stored an X.509 certificate as credentials 186 of peripheral device 180 and in credentials database 136 of cloud server 130. In addition, the vendor may have configured an indicator in a database (or other suitable storage) identifying TLS as the EAP method to be used to authenticate peripheral device 180. Accordingly, an EAP TLS method may be performed at 422 between supplicant 181 and authentication server 131.

Authenticator 161 acts as a middle entity to receive and forward messages between authentication server 131 and supplicant 181. Messages can be exchanged between authenticator 161 and authentication server 131 during the EAP method based on Radius or Diameter protocol, where the Radius/Diameter secret is based on the attestation exchange. Messages can be exchanged between authenticator 161 and supplicant 181 during the EAP method using a data link layer transport. During the EAP method, a master key can be created in both authentication server 131 and supplicant 181, according to the particular authentication scheme that is used (e.g., TLS). At 424, authentication server 131 sends a message to authenticator 161 that indicates the EAP method was a success. The message can include a pairwise master key (PMK), which can be a derivative of the master key in at least one embodiment. After the success message with the PMK is received, at 426, authenticator 161 sends a message to supplicant 181 that indicates the EAP method was a success.

At 428, supplicant 181 can derive the same or a complementary PMK from the master key that was created during the EAP method. At 430, the PMK is verified between the TEE and the peripheral device to ensure that they share corresponding PMKs. Various techniques can be implemented to perform this verification and embodiments disclosed herein are not limited to a particular technique. By way of example, a 4-way handshake could be performed between authenticator 161 and supplicant 181 to verify the PMK. Once the PMK is verified, at 432, it can be stored in the peripheral device (e.g., in PMK register 187), and at 436, the PMK can be stored in the TEE (e.g., in PMK database 167). The TEE may also store the identifier of the peripheral, which may be mapped to or otherwise associated with the PMK. Thus, trust can be established between the TEE and multiple peripheral devices, where a unique PMK is associated with each peripheral device, and mappings between the PMKs and their respective peripheral devices are stored in the TEE. Other parameters associated with the peripheral device may also be stored in the TEE including, but not limited to, a lifetime parameter and a reputation parameter. Parameters may be received from authentication server 131 and/or from the peripheral device itself.

In addition, as part of verifying the PMK at 430, a transport key may also be derived. For example, during a 4-way handshake between authenticator 161 and supplicant 181, the PMK can be used to derive a transport key. The transport key can be used to protect data (e.g., by encryption) that is exchanged between the peripheral device and the TEE. The transport key can be derived from the PMK each time the computing device associated with the TEE powers on and the PMK is verified. At 434, the transport key may be provided to peripheral device 180 to use for encrypting data exchanged with the TEE.

The lifetime parameter may be used to indicate a time during which the PMK remains valid. In at least one embodiment, the lifetime parameter enables a TEE to avoid repeating the attestation exchange and EAP method each time its associated computing device powers on. If the peripheral device and the TEE have a shared (or complementary) PMK that can be verified, and if the lifetime parameter has not expired, then when the computing device powers on, trust can be established at 438, based on the currently stored PMK. A new PMK may not need to be obtained until the lifetime parameter expires. In at least one embodiment, if the computing device moves outside of a connection range of the peripheral device, then the PMK may be rendered invalid and a new PMK may need to be established.

When a trusted relationship has been established between the TEE and the peripheral device, at least some network communications between the two may occur in a trusted mode. TEE is the only entity that can command the peripheral device to switch from a trusted mode (e.g., protected by a transport key to encrypt data being exchanged) to a non-trusted mode (e.g., data not encrypted, connection not protected by PMK). The command itself may also be encrypted. At 440, peripheral device 180 sends a trusted communication to authenticator 161 of the TEE. A trusted communication is inclusive of network communications that are communicated in a trusted mode including, but not limited to requests, messages, commands, queries, data and responses. At 442, a trusted data exchange can occur between peripheral device 180 and the TEE. In a trusted data exchange, data is exchanged in a trusted mode and may be encrypted, for example, using the transport key that is derived at 430 or when the computing device powered on. Once the trusted data exchange is complete, at 444, the TEE may send an untrusted command to instruct peripheral device 180 to return to the legacy mode, where it communicates in an untrusted manner with the other components on the platform. At 446, peripheral device 180 may send and/or receive untrusted data. In at least one embodiment, a sophisticated peripheral device may include multiple streams of data. In this scenario, the TEE may command peripheral device 180 to protect only a particular stream or subset of the data.

In one example scenario involving a data mule as computing device 150, trust may be temporarily established between the data mule and a peripheral device when the data mule physically moves into the connection range (e.g., WiFi, Bluetooth, etc.) of the peripheral device. For example, when a data mule passes by a peripheral device such as a sensor, such that the data mule can connect to the sensor (e.g., WiFi, Bluetooth, etc.), a connection can be made as indicated at 402. The E2E trusted connection protocol can be performed to establish trust between the data mule and the sensor. Data may be pulled and/or pushed from the sensor to the data mule after a trusted connection is established. The data mule may disconnect from the sensor, for example, when data mule physically moves outside the connection range of the sensor. In at least one embodiment, the PMK may be rendered invalid once the data mule is no longer connected to the sensor. Thus, each time a data mule connects to a peripheral device by moving into the connection range of the peripheral device, a new PMK may need to be established.

Figure 5:
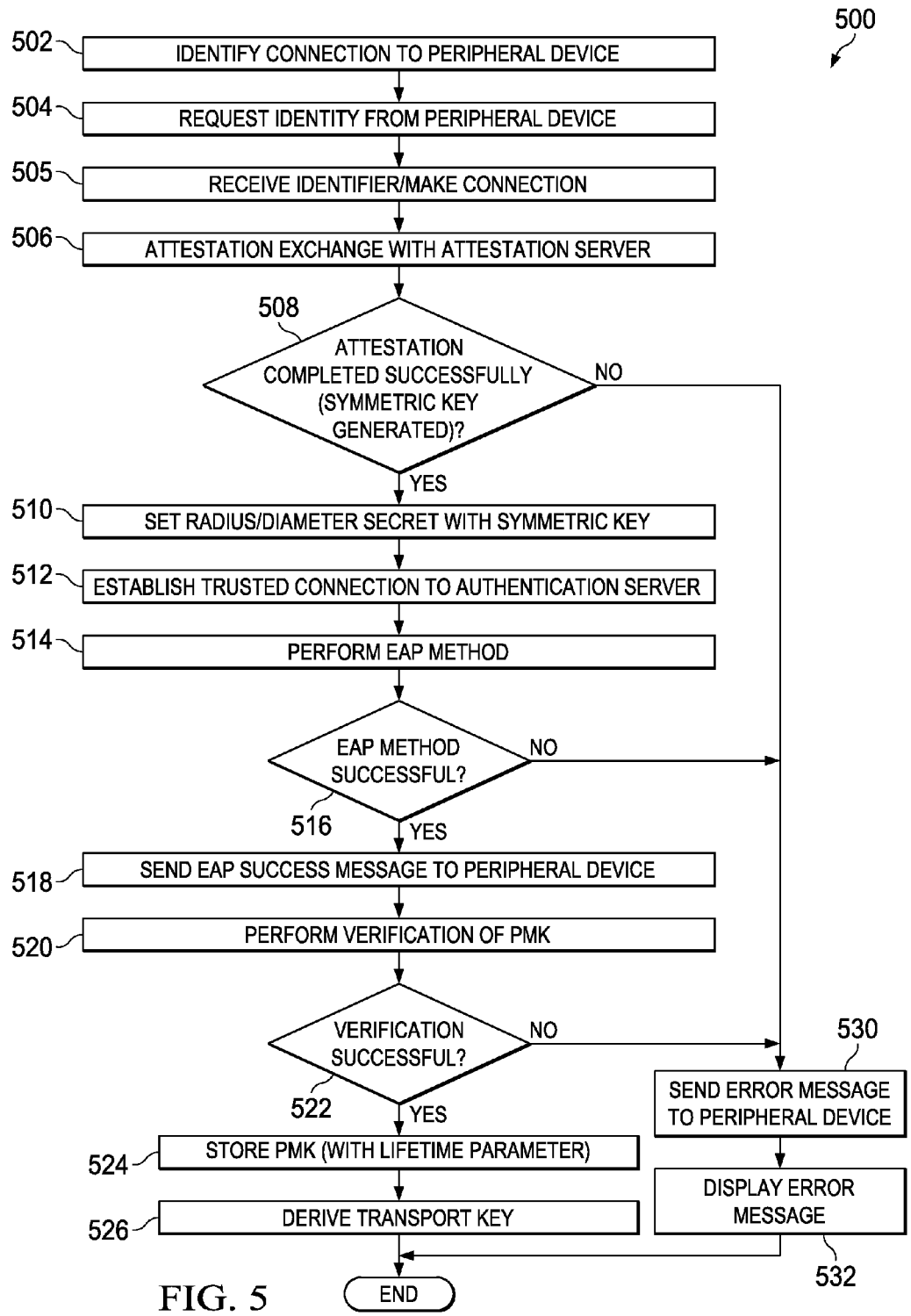
FIG. 5 is a simplified flowchart illustrating possible activities associated with at least one embodiment of the system for establishing trust according to the disclosure.

FIG. 5 is a flowchart of a possible flow 500 of operations that may be associated with embodiments described herein. In at least one embodiment, one or more sets of operations correspond to activities of FIG. 5. TEE 160 or a portion thereof, may utilize the one or more sets of operations. TEE 160 may comprise means such as processor 158, for performing the operations. In an embodiment, at least some operations of flow 500 may be performed by an authenticator (e.g., 161) and at least some other operations of flow 500 may be performed by an attestation client (e.g., 163). In one example, flow 500 of FIG. 5 may occur in communication system 100 when a connection has been established between a new peripheral (e.g., 180) and a computing device (e.g., 150) with a TEE (e.g., 160).

Flow 500 may begin at 502, where a TEE of a computing device identifies a connection that has been established between a new peripheral device and a computing device. At 504, a request is sent to the peripheral device for its identity. At 505, the identity is received from a supplicant of the peripheral device. In at least one embodiment, the identifier may be in the form of a local identifier and a domain name separated, for example, by an '@' symbol or other separator. The domain name can be used by the TEE to establish a connection to a cloud server associated with the peripheral device.

At 506, an attestation client of the TEE can perform an attestation exchange with an attestation server of the cloud server. The cloud server may be associated with a vendor of the peripheral device and configured with appropriate credentials to authenticate the peripheral device. At 508, a determination is made as to whether the attestation exchange was completed successfully. If the attestation exchange was not completed successfully, then at 530, an error message may be sent to the peripheral device. At 532, an error message may be displayed via a user interface of the computing device, and the attempt to establish trust between the TEE and the peripheral device may end.

If the attestation exchange has completed successfully as determined at 508, however, then an encryption key has been created in the attestation client in the TEE and the attestation server. At 510, a Radius or Diameter secret may be configured in the TEE based on the encryption key. In at least one embodiment, the Radius/Diameter secret is set to be the encryption key. At 512, the TEE establishes a secure and trusted connection to an authentication server of the cloud server, based on the Radius or Diameter protocol. The authentication server identifies one or more credentials associated with the peripheral device and also identifies an EAP method to be used for authenticating the peripheral device. At 514, the authentication server and a supplicant of the peripheral device perform the identified EAP method, with the authenticator in the TEE as the middle entity that receives and forwards messages between them.

At 516, a determination is made as to whether the EAP method was successfully completed. If the EAP method was not completed successfully, then at 530, an error message may be sent to the peripheral device. At 532, an error message may be displayed via a user interface of the computing device, and the attempt to establish trust between the TEE and the peripheral device may end.

If the EAP method has completed successfully as determined at 516, however, then a master key has been generated and is known by both the authentication server and the peripheral device. A master key or a derivative of the master key (e.g., a pairwise master key) may be received from the authentication server. The peripheral device can set a corresponding PMK to be used to establish trusted connections with the TEE. The corresponding PMK could be the master key or a derivation of the master key, depending to the particular implementation. At 518, a message may be sent to the peripheral device indicating that the EAP method has completed successfully. At 520, a process to verify the PMK may be performed. The verification process may be, for example, a 4-way handshake between the authenticator of the TEE and the supplicant of the peripheral device.

At 522, a determination is made as to whether the PMK verification was successful. If the PMK verification was not successful (i.e., the PMK was not verified), then at 530, an error message may be sent to the peripheral device. At 532, an error message may be displayed via a user interface of the computing device, and the attempt to establish trust between the TEE and the peripheral device may end. If the PMK verification was successful as determined at 522, however, then the PMK may be stored at 524. A lifetime parameter may also be stored with the PMK to indicate an amount of time during which the PMK remains valid. At 526, a transport key may be derived from the PMK. The transport key may be used to encrypt data during secure (trusted) communications between the TEE and the peripheral device.

The TEE can send a command to the peripheral device to indicate whether to operate in a trusted mode or in a legacy, untrusted mode. Trust can be established between the peripheral device and the TEE if a shared PMK can be verified. In at least some embodiments, whether a lifetime parameter has expired may also be considered. For example, if a lifetime parameter has expired, then a new PMK may need to be obtained using the attestation, authentication, and verification protocols as previously described. Otherwise, trust can be established based on verification of the currently stored PMK. Once trust is established between the TEE and the peripheral device and the peripheral device is operating in a trusted mode, data exchanged between the TEE and the peripheral device, including commands, may be encrypted based on the transport key. When the peripheral device is operating in a legacy mode, data exchanged between the TEE and the peripheral device may not be encrypted.

Figure 6:
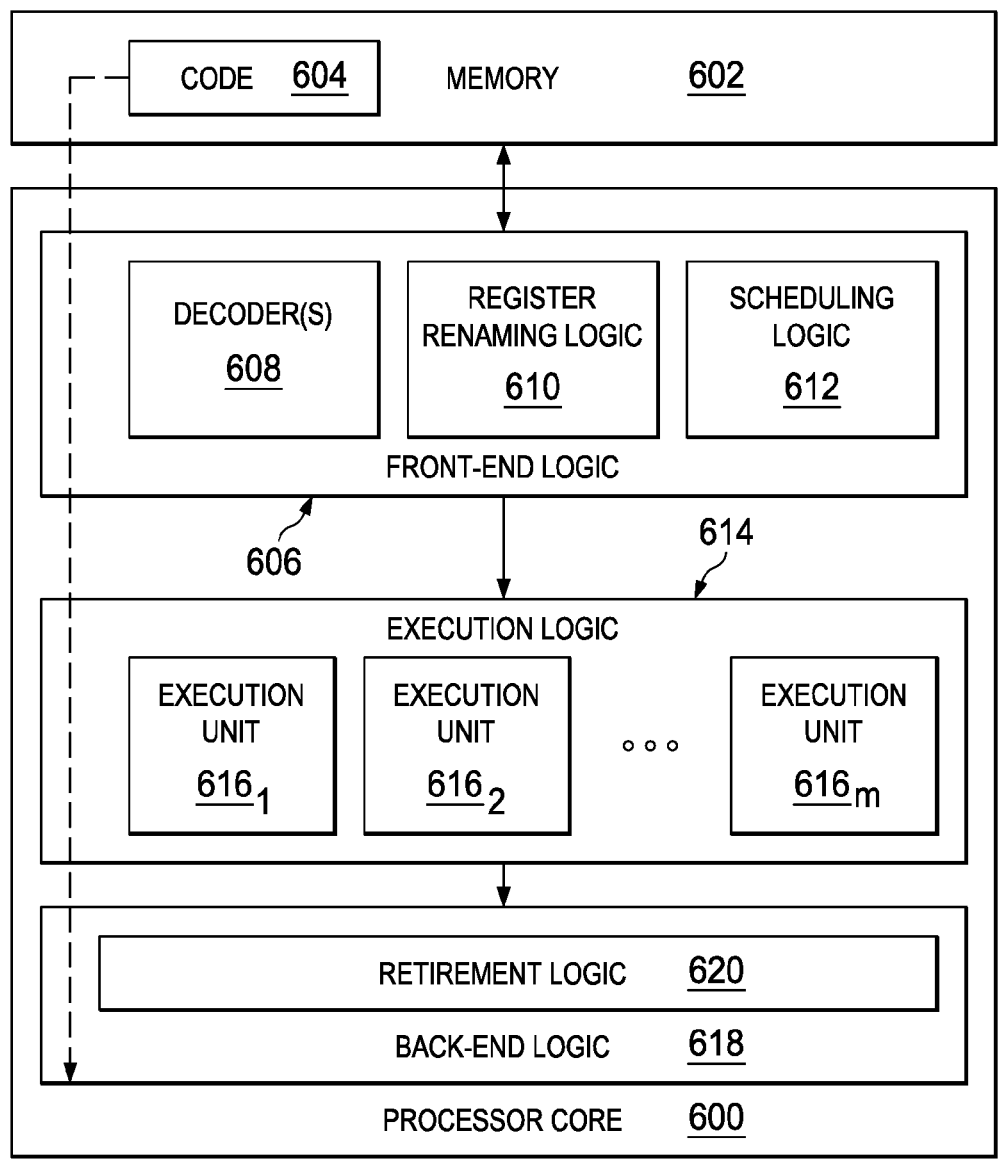
FIG. 6 is a block diagram of a memory coupled to an example processor according to an embodiment.

FIG. 6 is an example illustration of a processor according to an embodiment. Processor 600 is one possible embodiment of processor 139 of cloud server 130, processor 159 of computing device 150, and/or processor 189 of peripheral device 180. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 is one embodiment of memory element 138 of cloud server 130, memory element 158 of computing device 150, and/or memory element 188 of peripheral device 180. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Code 604, which may be one or more instructions to be executed by processor 600, may be stored in memory 602. Code 604 can include instructions of various modules (e.g., authentication server 131, attestation server 133, authenticator 161, attestation client 163, supplicant 181, cryptography modules 164 and 184, policy modules 165 and 185, etc.) that may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616-1 through 616-M. Some embodiments may include a number of execution units dedicated to specific functions or sets of functions. Other embodiments may include only one execution unit or one execution unit that can perform a particular function. Execution logic 614 can perform the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600. In an embodiment as shown and described with reference to FIG. 2, part of memory 158 may be encrypted and inaccessible to any code other than, for example, authenticator 161, attestation client 163, cryptography module 164, and policy module 165. This configuration can provide a trusted execution environment 160 and can protect data store therein, such as PMK database 167. In at least some embodiments, only specially crafted code (e.g., digitally signed) may be configured to run inside environment 160.

Figure 7:
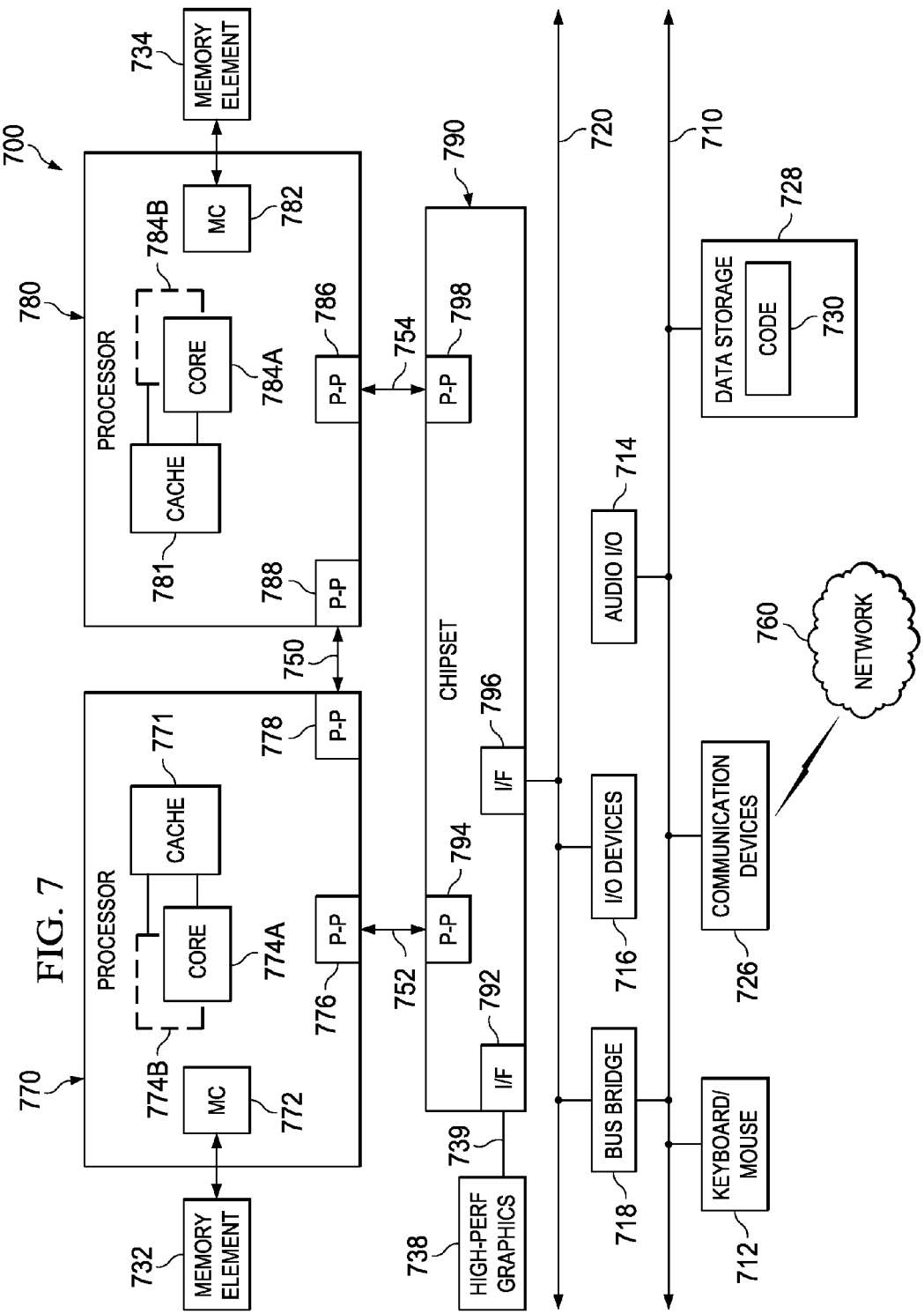
FIG. 7 is a block diagram of an example computing system that is arranged in a point-to-point (PtP) configuration according to an embodiment.

FIG. 7 illustrates one possible example of a computing system 700 that is arranged in a point-to-point (PtP) configuration according to an embodiment. In particular, FIG. 7 shows a system where processors, memory, and input/output devices are interconnected by a number of point-to-point interfaces. In at least one embodiment, cloud server 130 and/or computing device 150, shown and described herein, may be configured in the same or similar manner as exemplary computing system 700.

Processors 770 and 780 may also each include integrated memory controller logic (MC) 772 and 782 to communicate with memory elements 732 and 734. In alternative embodiments, memory controller logic 772 and 782 may be discrete logic separate from processors 770 and 780. Memory elements 732 and/or 734 may store various data to be used by processors 770 and 780 in achieving operations associated with protection of private data, as outlined herein.

Processors 770 and 780 may be any type of processor, such as those discussed with reference to processor 600 of FIG. 6, and processors 139, 159, and 189 of FIG. 2. Processors 770 and 780 may exchange data via a point-to-point (PtP) interface 750 using point-to-point interface circuits 778 and 788, respectively. Processors 770 and 780 may each exchange data with a control logic 790 via individual point-to-point interfaces 752 and 754 using point-to-point interface circuits 776, 786, 794, and 798. As shown herein, control logic is separated from processing elements 770 and 780. However, in an embodiment, control logic 790 is integrated on the same chip as processing elements 770 and 780. Also, control logic 790 may be partitioned differently with fewer or more integrated circuits. Additionally, control logic 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Control logic 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, joystick, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computing system depicted in FIG. 7 is a schematic illustration of an embodiment that may be utilized to implement various embodiments discussed herein. It will be appreciated that various components of the system depicted in FIG. 7 may be combined in a system-on-a-chip (SoC) architecture or in any other suitable configuration capable of achieving the protection of private data, according to the various embodiments provided herein.

Figure 8:
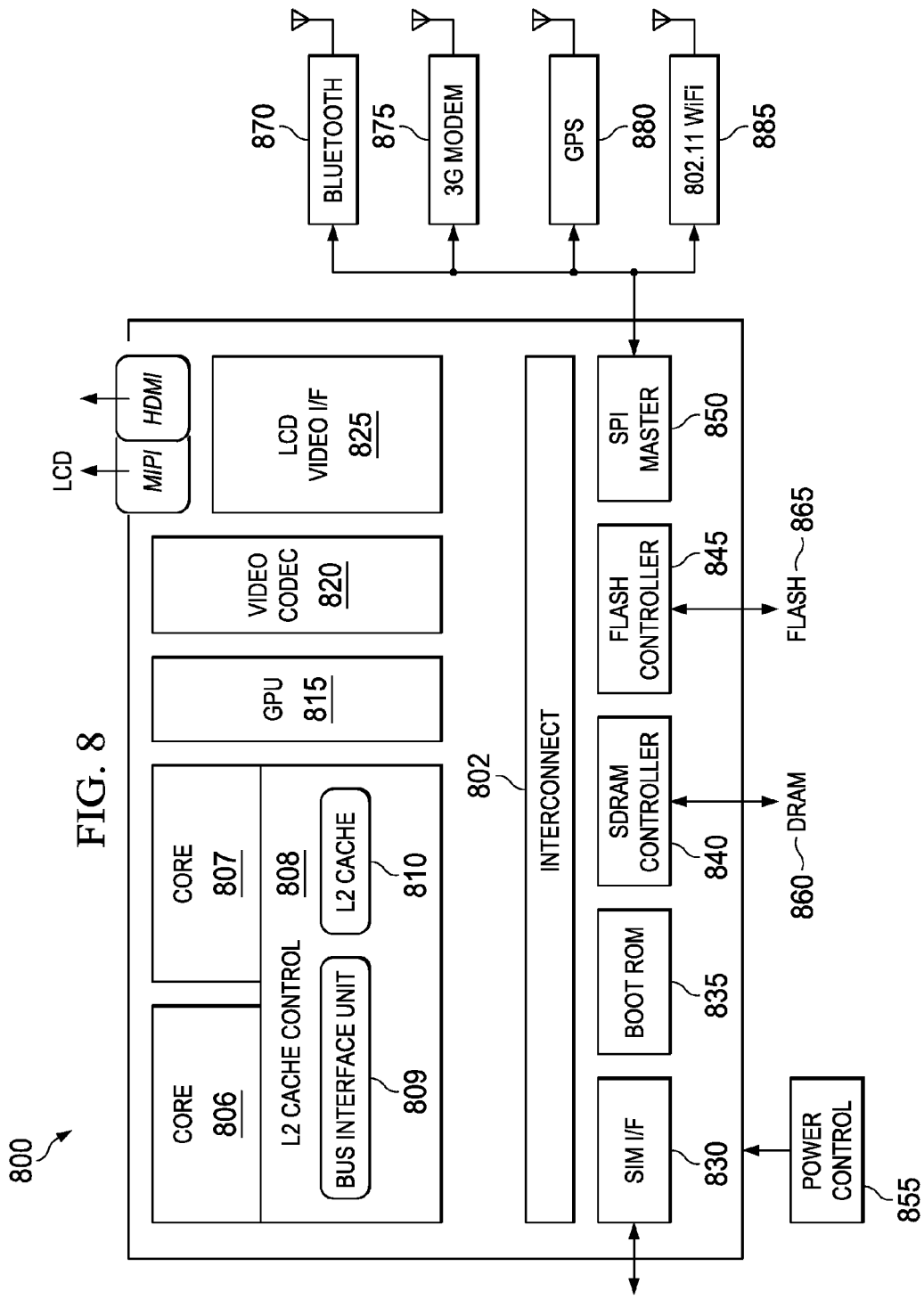
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the trust establishment features discussed herein and an ARM component. For example, the example of FIG. 8 can be associated with computing device 150. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

In at least one implementation scenario, cloud server 130, computing device 150, and peripheral device 180 include software to achieve (or to foster) the trust establishment activities, as outlined herein. Note that in one example, each of these elements can have an internal structure (e.g., a processor, a memory element, etc.) to facilitate some of the operations described herein. In some embodiments, these trust establishment activities may be carried out by hardware and/or firmware, implemented externally to these elements, or included in some other computing system to achieve the intended functionality. These elements may also include software (or reciprocating software) that can coordinate with other network elements or computing systems in order to achieve the operations, as outlined herein. In still other embodiments, one or several elements may include any suitable algorithms, hardware, software, components, modules, interfaces, or objects that facilitate the operations thereof. Modules may be suitably combined or partitioned in any appropriate manner, which may be based on particular configuration and/or provisioning needs.

Regarding the internal structure associated with cloud server 130, computing device 150, and peripheral device 180, these devices can include volatile and/or nonvolatile memory elements (e.g., memory elements 138, 158, 188) for storing data and information, including instructions, logic, and/or code, to be used in the operations outlined herein. Cloud server 130, computing device 150, and peripheral device 180 may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine readable media that are capable of storing data and information), software, hardware, firmware, or in any other suitable component, device, element, or object where appropriate and based on particular needs. Any of the memory items discussed herein (e.g., memory elements 138, 158, 188) should be construed as being encompassed within the broad term 'memory element.' Moreover, the information being used, stored, tracked, sent, or received in communication system 100 could be provided in any storage structure including, but not limited to, a repository, database, register, queue, table, or cache, all of which could be referenced at any suitable timeframe. Any such storage structures (e.g., credentials database 136, PMK database 167, PMK register 187, etc.) may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by one or more processors, or other similar machines, etc.), which may be inclusive of non-transitory machine readable storage media. Cloud server 130, computing device 150, and peripheral device 180 may include one or more processors (e.g., processors 139, 159, 189) that can execute logic or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Note that with the examples provided herein, interaction may be described in terms of two, three, or more computing systems. However, this has been done for purposes of clarity and example only. In certain cases, it may be easier to describe one or more of the functionalities of a given set of flows by only referencing a limited number of computing devices, peripheral devices, and cloud servers. Moreover, the system for establishing trust between hardware peripheral devices and a TEE is readily scalable and can be implemented across a large number of components (e.g., multiple peripheral devices associated with multiple cloud servers), as well as more complicated/sophisticated arrangements and configurations. Accordingly, the examples provided should not limit the scope or inhibit the broad teachings of the private data protection system as potentially applied to a myriad of other architectures.

It is also important to note that the operations described with reference to FIGS. 1-5, illustrate only some of the possible trust establishment activities that may be executed by, or within, communication system 100. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the trust establishment activities, these elements and operations may be replaced by any suitable architecture, protocols, and/or processes that achieve the intended functionality of the system for establishing trust.

Other Notes and Examples

Example C1 is at least one machine readable storage medium having instructions stored thereon for establishing a trusted relationship between a trusted execution environment (TEE) and a peripheral device, wherein the instructions, when executed by at least one processor, cause the at least one processor to communicate with an attestation server to generate an encryption key; establish, using the encryption key, a secure connection with an authentication server to enable communication between the authentication server and the peripheral device; receive a pairwise master key if the peripheral device is authenticated; and receive a trusted communication from the peripheral device based, at least in part, on the pairwise master key.

In Example C3, the subject matter of any one of Examples C1-C2 can optionally include where the TEE is to communicate with the peripheral device via a body area network (BAN).

In Example C4, the subject matter of any one of Examples C1-C3 can optionally include where the instructions, when executed by the at least one processor, cause the at least one processor to communicate with the peripheral device to verify the pairwise master key.

In Example C5, the subject matter of any one of Examples C1-C4 can optionally include where the trusted communication is encrypted based on a transport key derived from the pairwise master key.

In Example C6, the subject matter of any one of Examples C1-C5 can optionally include where the instructions, when executed by the at least one processor, cause the at least one processor to communicate an identifier of the peripheral device to the authentication server via the secure connection.

In Example C7, the subject matter of any one of Examples C1-C6 can optionally include where the instructions, when executed by the at least one processor, cause the at least one processor to send a command to the peripheral device to indicate whether to send a stream of a network communication in a trusted mode or a non-trusted mode.

In Example C8, the subject matter of any one of Examples C1-C6 can optionally include where the instructions, when executed by the at least one processor, cause the at least one processor to send a command to the peripheral device to identify a subset of multiple streams of a network communication to be sent in a trusted mode.

In Example C9, the subject matter of any one of Examples C1-C8 can optionally include where the instructions, when executed by the at least one processor, cause the at least one processor to store the pairwise master key with a lifetime parameter that indicates an amount of time during which the pairwise master key is to remain valid.

In Example C10, the subject matter of any one of Examples C1-C9 can optionally include where the encryption key is to be used as a secret in a Radius protocol or a Diameter protocol to establish the secure connection between the TEE and the authentication server.

In Example C11, the subject matter of any one of Examples C1-C10 can optionally include where the communication between the authentication server and the peripheral device is to be based on an extensible authentication protocol method.

In Example C12, the subject matter of any one of Examples C1-C11 can optionally include where the pairwise master key is to remain valid to enable the secure connection between the TEE and the peripheral device until the TEE moves outside of a connection range of the peripheral device.

In Example C13, the subject matter of any one of Examples C1-C12 can optionally include where the peripheral device is to be authenticated if one or more credentials in the peripheral device correspond to one or more credentials associated with the authentication server.

Example A1 is an apparatus for establishing a trusted relationship with a peripheral device, comprising a trusted execution environment to: communicate with an attestation server to generate an encryption key; establish, using the encryption key, a secure connection with an authentication server to enable communication between the authentication server and a peripheral device; receive a pairwise master key if the peripheral device is authenticated; and receive a trusted communication from the peripheral device based, at least in part, on the pairwise master key.

In Example A2, the subject matter of A1 can optionally include where the TEE is to identify a connection to the peripheral device before the peripheral device is authenticated to the authentication server, receive an identifier from the peripheral device, and establish a connection to the attestation server based on at least a portion of the identifier.

In Example A3, the subject matter of any one of Examples A1-A2 can optionally where the TEE is to communicate with the peripheral device via a body area network (BAN).

In Example A4, the subject matter of any one of Examples A1-A3 can optionally where the TEE is to communicate with the peripheral device to verify the pairwise master key.

In Example A5, the subject matter of any one of Examples A1-A4 can optionally where the trusted communication is encrypted based on a transport key derived from the pairwise master key.

In Example A6, the subject matter of any one of Examples A1-A5 can optionally where the TEE is to communicate an identifier of the peripheral device to the authentication server via the secure connection.

In Example A7, the subject matter of any one of Examples A1-A6 can optionally where the TEE is to send a command to the peripheral device to indicate whether to send a stream of a network communication in a trusted mode or a non-trusted mode.

In Example A8, the subject matter of any one of Examples A1-A6 can optionally where the TEE is to send a command to the peripheral device to identify a subset of multiple streams of a network communication to be sent in a trusted mode.

In Example A9, the subject matter of any one of Examples A1-A8 can optionally where the TEE is to store the pairwise master key with a lifetime parameter that indicates an amount of time during which the pairwise master key is to remain valid.

In Example A10, the subject matter of any one of Examples A1-A9 can optionally where the encryption key is to be used as a secret in a Radius protocol or a Diameter protocol to establish the secure connection between the TEE and the authentication server.

In Example A11, the subject matter of any one of Examples A1-A10 can optionally where the communication between the authentication server and the peripheral device is to be based on an extensible authentication protocol method.

In Example A12, the subject matter of any one of Examples A1-A11 can optionally where the pairwise master key is to remain valid to enable the secure connection between the TEE and the peripheral device until the TEE moves outside of a connection range of the peripheral device.

In Example A13, the subject matter of any one of Examples A1-A12 can optionally where the peripheral device is to be authenticated if one or more credentials in the peripheral device correspond to one or more credentials associated with the authentication server.

Example M1 is a method for establishing a trusted relationship between a trusted execution environment (TEE) and a peripheral device, the method comprising: communicating with an attestation server to generate an encryption key; establishing, using the encryption key, a secure connection with an authentication server to enable communication between the authentication server and the peripheral device; receiving a pairwise master key if the peripheral device is authenticated; and receiving a trusted communication from the peripheral device based, at least in part, on the pairwise master key.

In Example M2, the subject matter of M1 can optionally include identifying a connection to the peripheral device before the peripheral device is authenticated to the authentication server, receiving an identifier from the peripheral device, and establishing a connection to the attestation server based on at least a portion of the identifier.

In Example M3, the subject matter of any one of Examples M1-M2 can optionally include where the TEE is to communicate with the peripheral device via a body area network (BAN).

In Example M4, the subject matter of any one of Examples M1-M3 can optionally where the instructions, when executed by the at least one processor, cause the at least one processor to communicate with the peripheral device to verify the pairwise master key.

In Example M5, the subject matter of any one of Examples M1-M4 can optionally include where the trusted communication is encrypted based on a transport key derived from the pairwise master key.

In Example M6, the subject matter of any one of Examples M1-M5 can optionally include communicating an identifier of the peripheral device to the authentication server via the secure connection.

In Example M7, the subject matter of any one of Examples M1-M6 can optionally include sending a command to the peripheral device to indicate whether to send a stream of a network communication in a trusted mode or a non-trusted mode.

In Example M8, the subject matter of any one of Examples M1-M6 can optionally include sending a command to the peripheral device to identify a subset of multiple streams of a network communication to be sent in a trusted mode.

In Example M9, the subject matter of any one of Examples M1-M8 can optionally include storing the pairwise master key with a lifetime parameter that indicates an amount of time during which the pairwise master key is to remain valid.

In Example M10, the subject matter of any one of Examples M1-M9 can optionally include where the encryption key is to be used as a secret in a Radius protocol or a Diameter protocol to establish the secure connection between the TEE and the authentication server.

In Example M11, the subject matter of any one of Examples M11-M10 can optionally include where the communication between the authentication server and the peripheral device is to be based on an extensible authentication protocol method.

In Example M12, the subject matter of any one of Examples M1-M11 can optionally include where the pairwise master key is valid to enable the secure connection between the TEE and the peripheral device until the TEE moves outside of a connection range to the peripheral device.

In Example M13, the subject matter of any one of Examples M1-M12 can optionally include where the peripheral device is authenticated if one or more credentials in the peripheral device correspond to one or more credentials associated with the authentication server.

Example S1 is a system for establishing a trusted relationship between a trusted execution environment (TEE) and a peripheral device, where the system comprises: an authentication server configured to: establish, using an encryption key, a secure connection to the TEE; receive one or more credentials of the peripheral device from the TEE; attempt to authenticate the peripheral device based on the one or more credentials received from the TEE; and provide a pairwise master key to the TEE if the attempt to authenticate the peripheral device is successful.

In Example S2, the subject matter of Example S1 can optionally include an attestation server configured to generate the encryption key based on an attestation exchange with the TEE, and provide the encryption key to the authentication server.

In Example S3, the subject matter of any one of Examples S1-S2 can optionally include where the authentication server is configured to access one or more other credentials associated with the peripheral device to authenticate the peripheral device if the one or more other credentials correspond to the one or more credentials received from the TEE.

Example X1 is an apparatus for establishing a trusted relationship between a trusted execution environment (TEE) and a peripheral device, the apparatus comprising means for performing the method of any one of Examples M1-M13.

In Example X2, the subject matter of Example X1 can optionally include where the means for performing the method comprise at least one processor and at least one memory element.

In Example X3, the subject matter of any one of Examples X1-X2 can optionally include where the apparatus is a computing device.

In Example X4, the subject matter of Example X2 can optionally include where the at least one memory element comprises machine readable instructions that when executed, cause the apparatus to perform the method of any one of Examples M1-M13.

Example Z1 is least one machine readable storage medium comprising instructions for establishing a trusted relationship between a trusted execution environment (TEE) and a peripheral device, where the instructions when executed realize an apparatus, implement a method, or realize a system as described in any one of Examples A1-A13, M1-M13, S1-S3, or X1-X3.

What is claimed is:

1. At least one non-transitory machine readable storage medium comprising instructions stored thereon for establishing a trusted relationship between a trusted execution environment (TEE) and a peripheral device, wherein the instructions, when executed by at least one processor, cause the at least one processor to:
    communicate with an attestation server to cause an encryption key to be dynamically generated;
    establish, based on the encryption key, a secure connection between the TEE and an authentication server to enable communication between the authentication server and the peripheral device to authenticate the peripheral device;
    receive one or more messages at the TEE from the peripheral device, the one or more messages indicating one or more credentials of the peripheral device;
    provide the one or more messages from the TEE to the authentication server via the secure connection;
    receive a pairwise master key if the peripheral device is authenticated; and
    receive a trusted communication from the peripheral device based, at least in part, on the pairwise master key.

2. The at least one non-transitory machine readable storage medium of claim 1, wherein the instructions, when executed by the at least one processor, cause the at least one processor to:
    identify a connection to the peripheral device before the peripheral device is authenticated to the authentication server;
    receive an identifier from the peripheral device; and
    establish a connection to the attestation server based on at least a portion of the identifier.

3. The at least one non-transitory machine readable storage medium of claim 1, wherein the TEE is to communicate with the peripheral device via a body area network (BAN).

4. The at least one non-transitory machine readable storage medium of claim 1, wherein the instructions, when executed by the at least one processor, cause the at least one processor to:
    communicate with the peripheral device to verify the pairwise master key.

5. The at least one non-transitory machine readable storage medium of claim 1, wherein the trusted communication is encrypted based on a transport key derived from the pairwise master key.

6. The at least one non-transitory machine readable storage medium of claim 1, wherein the one or more messages include
an identifier of the peripheral device.

7. The at least one non-transitory machine readable storage medium of claim 1, wherein the instructions, when executed by the at least one processor, cause the at least one processor to:
send a command to the peripheral device to indicate whether to send a stream of a network communication in a trusted mode or a non-trusted mode.

8. The at least one non-transitory machine readable storage medium of claim 1, wherein the instructions, when executed by the at least one processor, cause the at least one processor to:
send a command to the peripheral device to identify a subset of multiple streams of a network communication to be sent in a trusted mode.

9. The at least one non-transitory machine readable storage medium of claim 1, wherein the instructions, when executed by the at least one processor, cause the at least one processor to:
store the pairwise master key with a lifetime parameter that indicates an amount of time during which the pairwise master key is to remain valid.

10. The at least one non-transitory machine readable storage medium of claim 1, wherein the encryption key is to be used as a secret in a Radius protocol or a Diameter protocol to establish the secure connection between the TEE and the authentication server.

11. The at least one non-transitory machine readable storage medium of claim 1, wherein the communication between the authentication server and the peripheral device is to be based on an extensible authentication protocol method.

12. The at least one non-transitory machine readable storage medium of claim 1, wherein the pairwise master key is to remain valid to enable the secure connection between the TEE and the peripheral device until the TEE moves outside of a connection range of the peripheral device.

13. The at least one non-transitory machine readable storage medium of claim 1, wherein the peripheral device is to be authenticated if one or more credentials in the peripheral device correspond to one or more credentials associated with the authentication server.

14. An apparatus for establishing a trusted relationship with a peripheral device, the apparatus comprising a trusted execution environment (TEE) to:
communicate with an attestation server to cause an encryption key to be dynamically generated;
establish, based on the encryption key, a secure connection between the TEE and an authentication server to enable communication between the authentication server and the peripheral device to authenticate the peripheral device;
receive one or more messages at the TEE from the peripheral device, the one or more messages indicating one or more credentials of the peripheral device;
provide the one or more messages from the TEE to the authentication server via the secure connection;
receive a pairwise master key if the peripheral device is authenticated; and
receive a trusted communication from the peripheral device based, at least in part, on the pairwise master key.

15. The apparatus of claim 14, wherein the TEE is to:
identify a connection to the peripheral device before the peripheral device is authenticated to the authentication server;
receive an identifier from the peripheral device; and
establish a connection to the attestation server based on at least a portion of the identifier.

16. The apparatus of claim 14, wherein the TEE is to:
communicate with the peripheral device to verify the pairwise master key.

17. The apparatus of claim 14, wherein the trusted communication is encrypted based on a transport key derived from the pairwise master key.

18. The apparatus of claim 14, wherein the one or more messages include
an identifier of the peripheral device.

19. The apparatus of claim 14, wherein the encryption key is to be used as a secret in a Radius protocol or a Diameter protocol to establish the secure connection between the TEE and the authentication server.

20. A method for establishing a trusted relationship between a trusted execution environment (TEE) and a peripheral device, the method comprising:
communicating with an attestation server to cause an encryption key to be dynamically generated;
establishing, based on the encryption key, a secure connection between the TEE and an authentication server to enable communication between the authentication server and the peripheral device to authenticate the peripheral device;
receiving one or more messages at the TEE from the peripheral device, the one or more messages indicating one or more credentials of the peripheral device;
providing the one or more messages from the TEE to the authentication server via the secure connection;
receiving a pairwise master key if the peripheral device is authenticated; and
receiving a trusted communication from the peripheral device based, at least in part, on the pairwise master key.

21. The method of claim 20, further comprising:
identifying a connection to the peripheral device before the peripheral device is authenticated to the authentication server;
receiving an identifier from the peripheral device; and
establishing a connection to the attestation server based on at least a portion of the identifier.

22. The method of claim 20, wherein the encryption key is to be used as a secret in a Radius protocol or a Diameter protocol to establish the secure connection between the TEE and the authentication server.

23. A system for establishing a trusted relationship between a trusted execution environment (TEE) and a peripheral device, the system comprising:
an attestation server configured to generate an encryption key based on an attestation exchange with the TEE; and
an authentication server configured to:
receive the encryption key from the attestation server;
establish, using the encryption key, a secure connection to the TEE;
receive one or more credentials of the peripheral device from the TEE;
attempt to authenticate the peripheral device based on the one or more credentials received from the TEE; and
provide a pairwise master key to the TEE if the attempt to authenticate the peripheral device is successful.

24. The system of claim 23, wherein the authentication server is configured to:
  access one or more other credentials associated with the peripheral device to authenticate the peripheral device if the one or more other credentials correspond to the one or more credentials received from the TEE.

25. The at least one non-transitory machine readable storage medium of claim 1, wherein the encryption key is generated at both the attestation server and the TEE.

26. The at least one non-transitory machine readable storage medium of claim 1, wherein the secure connection between the TEE and the authentication server is established using one of the encryption key or a derivative of the encryption key.

27. The at least one non-transitory machine readable storage medium of claim 1, wherein the trusted communication received from the peripheral device is encrypted using one of the pairwise master key or a derivative of the pairwise master key.

\* \* \* \* \*